United States Patent [19]

Judd

[11] 4,454,383

[45] Jun. 12, 1984

[54] ASYNCHRONOUS DATA TRANSMISSION METHOD AND CIRCUITRY

[75] Inventor: Thomas H. Judd, Madison, N.J.

[73] Assignee: Bell Telephone Laboratories, Incorporated, Murray Hill, N.J.

[21] Appl. No.: 443,392

[22] Filed: Nov. 22, 1982

[51] Int. Cl.$^3$ .................................. H04L 15/26
[52] U.S. Cl. ............................... 178/3; 375/113
[58] Field of Search ............ 178/3; 179/99 M, 2 DP, 179/2 R; 370/48, 91, 101, 42, 110.1; 375/113

[56] References Cited

U.S. PATENT DOCUMENTS 3,566,032  2/1971  Carbone et al. .................. 370/27
4,314,109  2/1982  Sekiguchi ..................... 179/99 M Primary Examiner—Stafford D. Schreyer
Attorney, Agent, or Firm—John A. Caccuro

[57] ABSTRACT

A method and circuitry are disclosed for asynchronously transmitting binary data over a communication pair without the use of start or stop bits. During a non-data transmitting state a quiescent differential voltage, which is intermediate to the binary data differential voltage levels, is placed on the pair. The start of a data transmission is signaled by a transition of the differential voltage from the quiescent state voltage to the binary voltage of the first data bit of the data transmission. Since all data transmissions are of known bit lengths, the end of a data transmission is determined by counting data bits.

14 Claims, 5 Drawing Figures

ASYNCHRONOUS DATA TRANSMISSION METHOD AND CIRCUITRY

TECHNICAL FIELD

This invention relates to asynchronous data transmission and more particularly to a method and circuitry for providing asynchronous binary data transmissions without the use of a start bit sequence.

BACKGROUND OF THE INVENTION

The transmission of data over a facility can occur in an asynchronous or synchronous manner. In the asynchronous manner the data bits of a block of data (character, frame, etc.) are transmitted in a strict line sequence, but the blocks of data are not transmitted in a strict time sequence. Since the blocks of data are not transmitted in a strict time sequence, start and stop bits are required to enable the receiving terminal to resynchronize itself to the incoming data. Thus, a disadvantage of using asynchronous data transmission is that it utilizes extra facility capacity for the start and stop bits that need to be transmitted along with a block of data.

In some asynchronous binary data transmission systems the mark to space transition (i.e., a predetermined binary signal transition) is used to signal the start of a data transmission. In such systems the mark state is utilized as one of the binary data states as well as the quiescent state, when no data is being transmitted over the facility. This double usage of the mark state can create a problem when data transmissions are made in a half-duplex manner. When such a system is utilized for half-duplex data transmission (i.e., ping-pong operation) over a 2-wire facility, a control signal (i.e., a carrier signal burst or unique code word) is also required to signal the completion of transmission and the release of the facility by the transmitting party. Undesirably, this control signal adds complexity or utilizes valuable facility capacity.

Thus, there is a continuing need for an asynchronous communication method and circuitry which eliminates the need to utilize start/stop bits or complex control signals to synchronize data transmissions over a facility.

SUMMARY OF THE INVENTION

A method and circuitry are disclosed for asynchronously transmitting binary data over a communication pair using a start sequence comprising a transition from a quiescent differential voltage, a voltage intermediate to the voltage levels representing the binary data signals on the pair, to the differential voltage of the first bit of the binary data transmission. Utilization of this differential voltage transition as the start sequence of a data transmission enables the transmitting party to signal the receiving party of the start of a data transmission without utilizing valuable facility capacity. At the receiver location this differential voltage transition from the quiescent state voltage to either the logic 0 or 1 binary voltage is used to resynchronize the receiver to the incoming data transmission. Since each data transmission has a predetermined block length, the end of a data transmission is determined by counting the received data bits.

In the preferred embodiment of the invention, a method and circuitry are disclosed for transmitting binary data asynchronously in a half-duplex mode over a 2-wire data pair or facility. In the preferred embodiment the differential voltage present on the pair during the quiescent state is generated by biasing resistors located at the receiver. During the differential voltage transition, the voltage on the pair is derived from transmitter current sources which drive the pair. After the transition, differential voltages present on the pair are derived from voltage sources located at the transmitter. The use of current sources to drive the facility during the differential voltage transitions limits current flow over the facility, thus providing inherent short circuit protection and reducing cross talk to other facilities. The low termination impedances of the facility at both the transmitter and receiver provide noise immunity during the quiescent and transition states. The use of a voltage sources to drive the facility during the stable data transmission state provides good noise immunity.

BRIEF DESCRIPTION OF THE DRAWING

The operation and utilization of the present invention will be more apparent from the following description taken in conjunction with the drawing in which.

GENERAL DESCRIPTION

Figure 1:
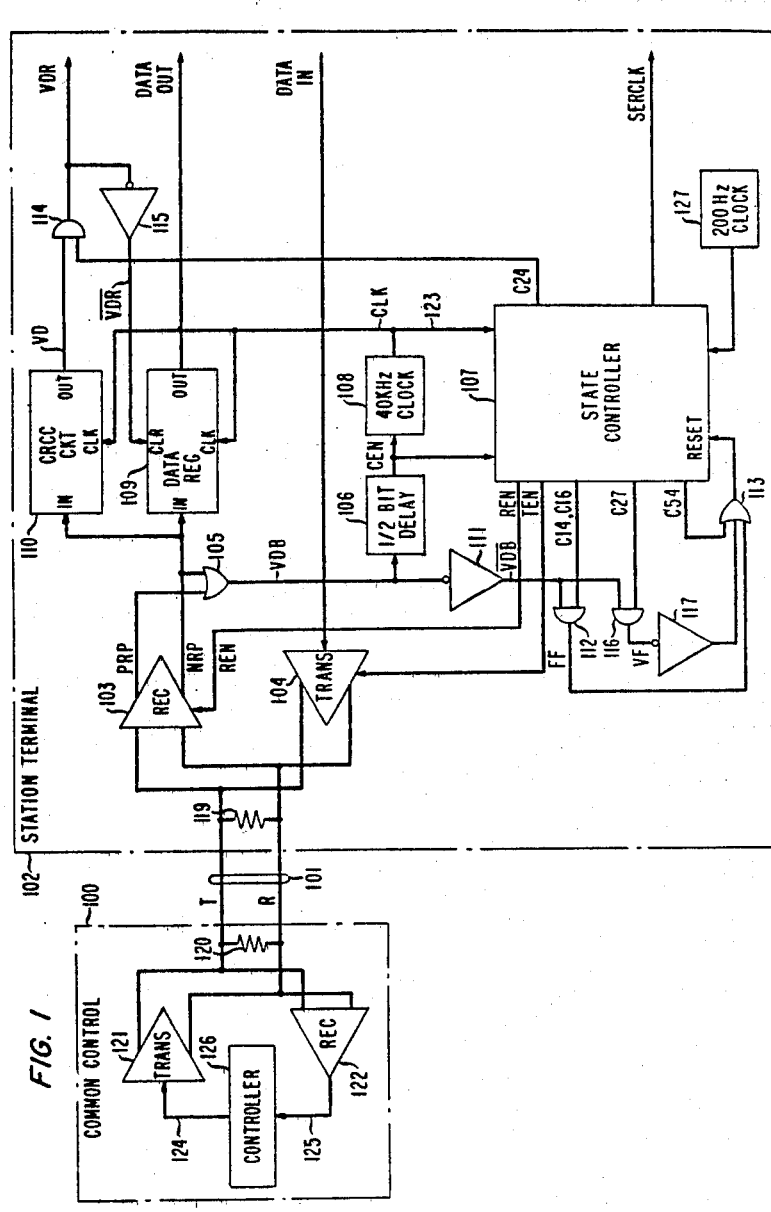
FIG. 1 shows the present invention as part of a communication system.

The present invention is shown in FIG. 1 as part of a telephone communication system. Although not shown, station terminal 102 could be part of a key telephone station set connected via a multiple pair facility to a stored program common control unit which would include common control 100. Since the telephone circuitry utilized to establish a telephone voice connection is well known and is not part of the present invention, it will not be further described herein. Moreover, circuitry for generating control data at common control 100 and for generating status data at terminal 102 are also well-known and are not necessary for an understanding of the present invention.

The present invention is utilized to transmit asynchronous binary data in a half-duplex mode over a facility, data pair 101, which, typically, is part of a multiple pair facility interconnecting each key telephone station set with the program controlled common control unit. Generally the data transmitted between the common control unit and the station sets consists of various commands and status associated with the establishment of a telephone connection. Since the present invention is directed to a method and circuitry for the bidirectional asynchronous transmission of binary data over a communication facility, the source and destination of the data and its use by the system will not be described herein. It should be recognized that the present invention is not limited to telephone communication systems applications but can be implemented for use in any asynchronous data transmission application.

In FIG. 1, a preferred embodiment of the present invention is shown as part of station or terminal 102 which connects over two-wire data pair 101 to common control 100. Similar circuitry is provided at common control 100 to enable compatible half-duplex asynchronous data communications with station terminal 102. With joint reference to FIGS. 1, 4 and 5, a general description of the sequence of data communication between common control 100 and station terminal 102 will be given.

Common control 100 periodically transmits a frame of control data 402 and awaits an immediate response consisting of a frame of status data 404 from terminal 102. Thereafter, no communication occurs until common control 100 again interrogates terminal 102. Thus, communications between common control 100 and station terminal 102 occur in a half-duplex manner over data pair 101.

Figure 4:
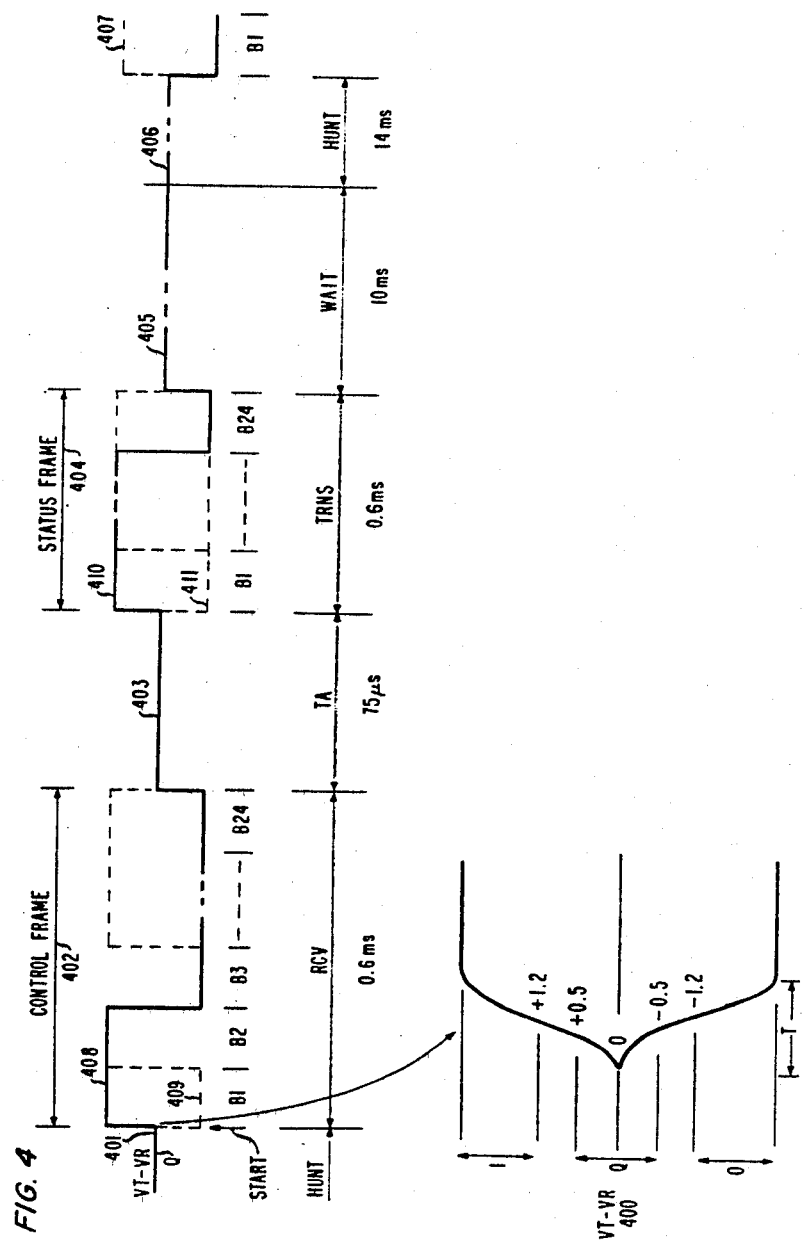
FIG. 4 shows a typical voltage waveform on the communication facility.

Waveform VT-VR of FIG. 4 represents the differential voltage across the tip T and ring R leads of data pair 101. Assuming for the moment a quiescent state (Q) 401, when no data communication exists on data pair 101, the voltage VT-VR is about zero volts, and essentially no current flows over data pair 101. During quiescent state 401, station terminal 102 is in the HUNT mode 501, whereby it is constantly checking for the next incoming control frame of data on data pair 101. When common control 100 transmits data, e.g. control frame 402, voltage VT-VR switches to the voltages associated with the binary data. Terminal 102 detects the initial transition of voltage VT-VR and goes into the receive RCV mode. At the conclusion of the transmission of control frame 402, voltage VT-VR returns to zero during quiescent state 403 and terminal 102 enters its line turn around mode TA. A predetermined time later, terminal 102 enters the transmit mode, TRNS, to transmit a status frame 404 which is received by common control 100. After transmission of status frame 404, terminal 102 enters the WAIT mode 405. The WAIT mode is a time period during which receiver 103 is disabled to minimize noise exposure and hence no data reception can occur at this time. After a predetermined period of time in the WAIT mode, terminal 102 enters the HUNT mode again.

DETAILED DESCRIPTION

Figure 5:
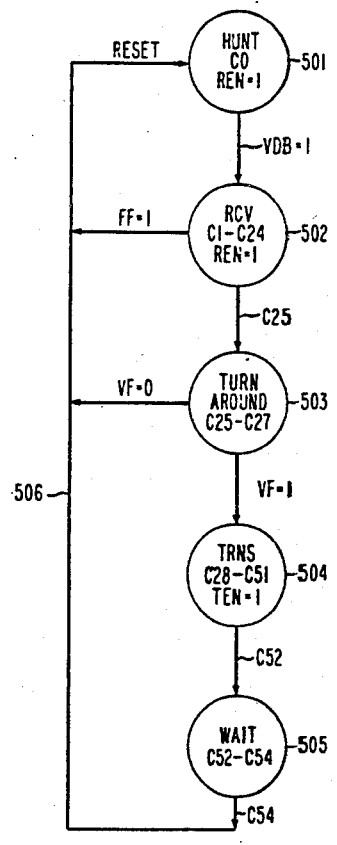
FIG. 5 shows the operating state diagram of the system shown in FIG. 1.

The specific operation of station terminal 102 will be described with joint reference to FIGS. 1, 4 and 5. Assuming that no data is being transmitted on data pair 101, i.e. the system is in quiescent state, voltage VT-VR is approximately zero volts 401 and station terminal 102 is in the HUNT mode. Controller 126 of common control 100 generates a control frame consisting of a predetermined number of control data bits on lead 124 which data is transmitted by transmitter 121 over data pair 101. When data transmission begins at common control 100, differential voltage VT-VR will either go positive 408 representing a logic 1 or negative 409 representing a logic 0 first bit of control frame 402. Assuming that the first data bit is a 1, 408, the transition in voltage VT-VR from approximately 0 volts to greater than +1.2 volts is detected by receiver 103. Thus, this first data bit also acts as the start bit for control frame 402. During the reception of the first data bit, a valid data bit signal VDB is generated which causes station terminal 102 to enter the RCV mode 502 from the HUNT mode 501. As shown in FIG. 1, signal VDB is generated by gate 105 when either a positive received pulse (PRP), a logic 1 data bit, or a negative received pulse (NRP), a logic 0 data bit, is detected across data pair 101 by receiver 103. Since the received data is always a logic 0 or logic 1, signal VDB essentially remains at a steady logic 1 signal during the transmission of control frame 402.

To distinguish noise from data, signal VDB is sampled at six times the data rate of 40 Kbs. When three consecutive samples indicate that data is still present, a delay circuit 106 is triggered and outputs a clock enable signal CEN, one-half bit time later, to 40 KHz clock 108 and state controller 107. It is this clock enable signal CEN which actually causes state controller 107 to switch from the HUNT mode 501 to the RCV mode 502. The output 123 of 40 KHz clock 108 provides a clock signal to CRCC circuit 110, data register 109 and state controller 107.

State controller 107 is basically a counter and decoder circuit which generates 54 discrete states between the reception of consecutive control frames 402 and 407. The 54 discrete states are divided into the operating modes of terminal 102 including the receive (RCV), turn around (TA), transmit (TRNS), WAIT, and HUNT modes. During the receive RCV mode 502, states C1–C24 occur at the bit clock rate (40 KHz) concurrently with received data bits B1–B24 of control frame 402. During the turn around TA mode 503, states C25–C27 also occur at the bit clock rate (40 KHz). During this turn around mode 503 no data is present, 403, on data pair 101. During the terminal transmit TRNS mode 504, states C28–C51 occur concurrently with bits B1–B24 of status frame 404. The WAIT state 505 includes states C52–C53 which are counted by controller 107 at a slower clock rate of 200 Hz as derived from clock 127. State C54 comprises the HUNT mode 501, at which time receiver 103 is enabled by signal REN to again look for received data on data pair 101. State controller 107 can be implemented in a well-known manner using standard integrated circuit chips.

As noted, signal VDB is logic 1 during reception of bits B1–B24 of control frame 402. State controller 107 performs two periodic checks during data bits B14 and B16, to assure that data is still being received during control frame 402. These checks are performed by gate 112 which ANDs signal $\overline{VDB}$ (the signal VDB inverted by inverter 111) and a signal C14/C16 which becomes logic 1 during states C14 (B14) and C16 (B16) of state controller 107. If data is no longer present on control pair 101 during either state C14 or C16, signal VDB is logic 0, $\overline{VDB}$ is logic 1, and AND gate 112 outputs a logic 1 signal FF to OR gate 113 which outputs a RESET signal to state controller 107. As shown by FIG. 5, when state controller 107 receives a RESET signal of logic 1, it returns from the RCV mode to the HUNT mode, signifying that the received data is not a control frame of data.

Note, gate 112 checks if data is present on control pair 101 but does not check whether the data is in error. Checking the control frame 402 data for errors is provided in a conventional manner using the cyclic redundancy check character (CRCC), the last group of bits of control frame 402, sent by common control 100. At station terminal 102, CRCC circuit 110 receives the transmitted CRCC code and compares it with the CRCC code generated from the received data to determine the existence of a data error. If a control frame 402 is received in error, the valid data VD lead would be at logic 0, inhibiting gate 114 from outputting a valid data received VDR signal. Inverter 115 generates a signal $\overline{VDR}$ which clears data from data register 109 via terminal CLR when a data error is detected by the CRCC circuit. Station terminal 102 signals common control 100 of the error in control frame 402 using status frame 404, resulting in control frame 402 being retransmitted by common control 100.

As data is being received, state controller 107 counts through the bits of control frame 402 and data register 109 loads each bit of the received data from lead NRP of receiver 103. Since 40 KHz clock 108 drives both data register 109 and state controller 107, a synchronism exists between received data bits (B1–B24) and count states (C1–C24) of state controller 107. State controller 107 outputs a serial clock signal SERCLK consisting of 16 pulses coincident with the 16 data bits in control frame 402. Logic circuits, not shown, in station terminal 102 use signal SERCLK to clock data bits from the DATA OUT lead to various storage and control circuits. These circuits do not act on these data bits until gate 114 outputs a valid data ready VDR signal on count 24, signifying an error free data reception of control frame 402.

At the completion of the reception of control frame 402, at counter state C25, state controller 107 enters the turn around (TA) mode for a period of time approximately equal to three bit times. At counter state C27 the quiescent condition of data pair 101 is checked by gate 116. Gate 116 also provides state controller 107 with another check to determine if the previously received data was in fact a control frame 402. If data pair 101 is now in the quiescent state 403, as it should be after reception of control frame 402, then signal $\overline{VDB}$ is logic 1 and a valid frame signal VF is outputted from gate 116. The valid frame signal VF indicates that the control frame 402 of the correct length has been received by station terminal 102.

Note, in the event that data still exists on data pair 101 at counter state C27, then the received data transmission was not a valid control frame 402. Hence, $\overline{VDB}$ is logic 0 and gate 116 generates a signal VF of logic 0 and inverter 117 outputs a logic 1 generating a RESET signal from OR gate 113. As shown in FIG. 5, the signal VF at logic 0 causes a reset 506 of state controller 107 to the HUNT mode.

Assuming a valid control frame 402 is received, VF is logic 1, station terminal 102 enters the transmit TRNS mode 504 when counter state reaches C28. During the TRNS mode station terminal 102 transmits data to common controller 100 in a status frame 404 format. As shown in FIG. 4, status frame 404, like control frame 402, is a 24 bit frame. In the TRNS mode, state controller 107 outputs a transmit enable signal TEN at logic 1. The signal TEN enables the transmission of a status frame to be transmitted from station terminal 102.

As will be described in detail in a later paragraph, transmitter 104 outputs a binary state voltage signal on data pair 101. As shown in FIG. 1, data to be transmitted in the status frame 404 is received by lead DATA IN from another part of station terminal 102. A logic 1 signal on lead DATA IN generates a positive VT-VR signal as shown by 410 of FIG. 4, while a logic 0 generates a negative VT-VR signal 411.

Receiver 122 of common control 100 receives data over control pair 101 and outputs the data on lead 125 to controller 126. The operation of receiver 122 is the same as receiver 103 which will be described in detail in a later paragraph. Common control 100 includes circuitry, not shown, which enables the half-duplex operation over data pair 101. In a well known manner, similar to that described for station terminal 102, common control 100 is arranged to periodically transmit control frame 402 to and receive status frame 404 from station terminal 102 approximately every 25 ms in the timed sequence illustrated in FIG. 4.

During the TRNS mode of station terminal 102, state controller 107 enables data from lead DATA IN to be transmitted by transmitter 104 at a 40 Kbs rate. When state controller 107 reaches count C51, all 24 bits of data in status frame 404 have been transmitted and transmitter 104 is disabled when TEN becomes logic 0. State controller 107 enters the WAIT mode 505 on count C52.

During the WAIT mode, time period 405, state controller 107 no longer counts at the 40 KHz rate of counter 108, but switches to count at the 200 Hz rate of clock 127. Thus, the WAIT mode consisting of counter states C52 and C53 is about 10 ms long, during which time both REN and TEN are at logic 0 and hence transmitter 104 and receiver 103 are disabled. Note, because control frames 402 are only transmitted every 25 ms, receiver 103 is not enabled immediately after the TRNS mode ends. Keeping receiver 103 disabled during the WAIT mode prevents false start-ups during this 10 ms time period and hence improves the system noise immunity.

At count C54, state controller 107 resets to the HUNT mode 501 and receiver 103 is enabled when signal REN is set at logic 1. In the HUNT mode, time period 406, receiver 103 is poised to receive the next control frame of data 407.

TRANSMITTER AND RECEIVER DESCRIPTION

The detailed operation of identical transmitters 104 and 121 and identical receivers 103 and 122 is described in the following paragraphs. In accordance with the present invention data transmissions such as control frame 402 and status frame 404 occur without the need of start bit or stop bit sequences. The method and circuitry for implementing the present invention will be described with joint reference to FIGS. 1, 2, and 3.

Both common control 100 and terminal 102 have line termination resistances, respectively, 119 and 120, to match the impedance of two-wire data pair 101. Receiver 103 and transmitter 104 connect in parallel across data pair 101. Similarly, common control 100 includes a transmitter 121 and receiver 122 connected in parallel across data pair 101. During the quiescent time, when no binary data is being transmitted, the voltage VT-VR across the tip T and ring R leads on data pair 101 is established by input resistor networks of receivers 103 and 122. This quiescent voltage is approximately midway between the voltages which represent a logic 0 and a logic 1 data bit on data pair 101. With reference to FIG. 4, as shown by 400, a VT-VR of greater than about +1.2 volts represents a logic 1 while a voltage less than about −1.2 volts represents a logic 0. The quiescent voltage is the range of VT-VR between −0.5 to +0.5 volts. An indeterminable state exists between +0.5 to +1.2 and −0.5 to −1.2 volts.

Figure 3:
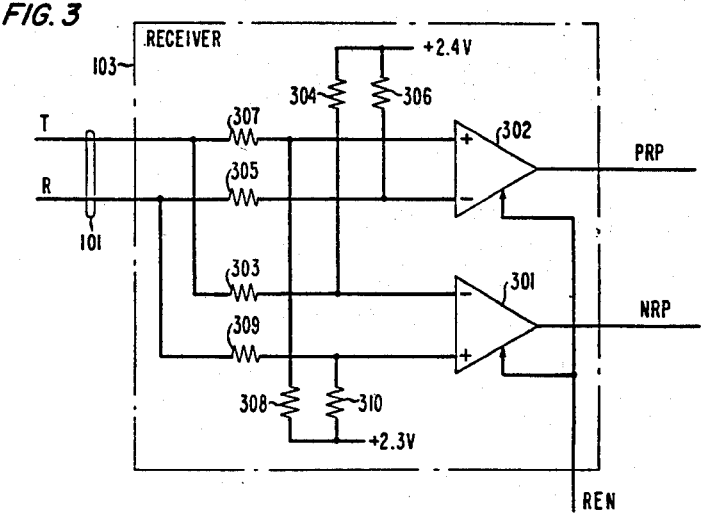
FIG. 3 shows the details of the receiver circuit.

With reference to FIG. 3, the operation of the circuitry of receiver 103 will be described. The circuitry of receiver 123 operates in the same manner as receiver 103. A logic 1 on lead REN enables voltage comparators 301 and 302. Voltage comparators 301 and 302 are well-known operational amplifiers connected in an inverse parallel manner to the tip T and ring R leads of data pair 101. The use of two voltage comparators 301 and 302 permits the detection of a three-state voltage, i.e., logic 0, logic 1 and quiescent, on data pair 101. Resistors 303, 304, 309 and 310 comprise an input network selected to divide down, respectively, the tip T and ring R voltages for voltage comparator 301. Similarly, resistors 307, 308, 305 and 306 comprise an input network selected to divide down, respectively, the tip T and ring R voltages for voltage comparator 302.

When the voltage across tip T and ring R leads, VT-VR, exceeds about +1.2 volts voltage comparator 302 outputs a logic 1 on lead PRP. Under these voltage conditions, the output on lead NRP of voltage comparator 301 is logic 0. When the voltage across tip T and ring R leads, VT-VR, is within +0.5 to −0.5 volts, both voltage comparators 301 and 302 output a logic 0. When the voltage VT-VR is less than −1.2 volts, voltage comparator 302 outputs a logic 0 and voltage comparator 301 outputs a logic 1 on lead NRP.

Figure 2:
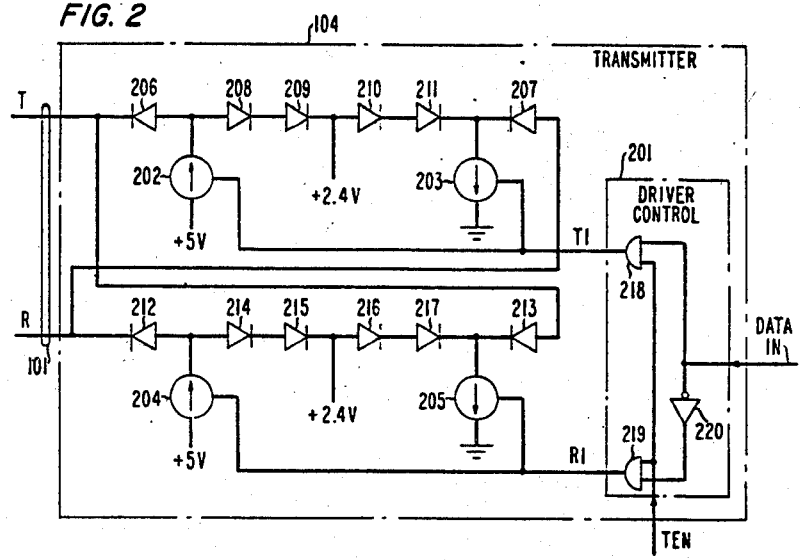
FIG. 2 shows the details of the transmitter circuit.

With reference to FIG. 2, the circuitry of transmitter 104 is detailed. The circuitry of transmitter 122 is identical to that of transmitter 104. As noted previously, transmit enable lead TEN is at logic 0 except during the transmit state. With lead TEN at logic 0, driver control 201 is not enabled and hence neither lead T1 nor lead R1 is at logic 1. Driver control 201 consists of AND gates 218, 219 and inverter 220. When lead TEN is logic 0, AND gates 218 and 219 both output a logic 0. When lead TEN is at logic 1, a logic 1 and 0 on lead DATA IN results in, respectively, a logic 1 and 0 on lead T1 and a logic 0 and 1 on lead T0. Thus, when driver control 201 is enabled, a logic 1 input on lead DATA IN enables substantially identical current sources 202 and 203 while disabling substantially identical current sources 204 and 205. Similarly, a logic 0 input on lead DATA IN disables current sources 202 and 203 while enabling current sources 204 and 205.

During a quiescent period, lead TEN is at a logic 0 and driver control 201 is disabled and hence current sources 202-205 are disabled. In this condition diodes 206-217 prevent the +2.4 volt supply from sourcing or sinking current from the tip T or ring R leads of data pair 101. During the quiescent period, transmitters 104 and 121 are essentially disconnected from data pair 101 and hence the dc voltage on data pair 101 is determined by the resistors in receivers 103 and 122.

Referring to FIG. 3, since voltage comparators 301 and 302 have a high input impedance, the voltage on leads T and R is determined by the +2.4 and +2.3 volt sources and the terminating resistors 119 and 120. The differential voltage VT-VR is less than +0.1 volt, well within the quiescent voltage range (+0.5 to −0.5) shown in FIG. 4. With the quiescent voltage on leads T and R, the outputs of receivers 301 and 302 of FIG. 3 are both logic 0.

Returning to FIG. 2, during a transmit TRNS mode lead TEN is at logic 1 enabling driver control 201. With driver control 201 enabled, a logic 0 on lead DATA IN produces a logic 0 signal on lead T1 and a logic 1 signal on lead R1. During this condition current sources 202, 203 are disabled and current sources 204 and 205 are enabled. The result is a loop current flow of about 22 milliamps (ma) through the ring lead R, common control 100 and back over the tip lead T. Similarly, assuming a logic 1 data bit exists on lead DATA IN, then lead T1 is logic 1 and lead R1 is logic 0 resulting in current sources 202, 203 being enabled while current sources 204, 205 are disabled. In this case a loop current flow of approximately 22 ma is generated by current sources 202 and 203. This loop current flows through diode 206 to lead T, resistors 119 and 120, receivers 103 and 122, lead R, diode 207 to current source 203. Since R1 is logic 0, current source 205 is off, and no current flows through diode 213.

As shown by 400 on FIG. 4, switching the VT-VR differential voltage transition from a quiescent state dc voltage to either the logic 0 or logic 1 dc line voltage takes about T seconds. Time period T is the time it takes the current sources of transmitter 104 to charge the line capacitance (not shown) of data pair 101 and switch the differential voltage on data pair 101 to the differential voltage of the first bit of the binary data signal. During this transition time period T, data pair 101 is terminated at each end only by 300 ohm resistors 119 and 120, since the impedances of transmitters 104 and 121 and receivers 103 and 122 are at a high impedance level. Note, the impedance of the resistor networks of receivers 103 and 122 are large compared to 300 ohms. The use of current sources to drive data pair 101 limits to T seconds the rise time of the voltage transitions on the data pair 101, thus reducing crosstalk to adjacent wire pairs. Additionally, the use of a current source inherently limits current flow and hence provides its own short circuit protection in the event data pair 101 becomes shorted.

Returning to FIG. 2 and the previous example where lead T1 is logic 1 and current sources 202, 203 are enabled and current sources 204, 205 are disabled, once the voltage on lead T rises to the stable data state dc voltage level of approximately 3.1 volts, diodes 208 and 209 conduct and provide a low impedance to current flow from current source 202. Concurrently, the voltage on lead R falls to approximately +1.7 volts at which time diodes 210 and 211 conduct and conduct some of the approximately 22 ma of current to current source 203. Thus, during this steady data state period, transmitter 104 acts like a voltage source which supplies a VT-VR voltage of about 1.4 volts (VT = +3.1, VR = +1.7) across the tip T and ring R leads of data pair 101. The low impedance of this voltage source during the steady data state portion of the data transmission provides excellent noise immunity for the system. It should be obvious that in a converse manner a logic 0 on lead DATA IN causes transmitter 104 to generate VT-VR voltage of −1.4 volts with a low source impedance.

Since lead REN is logic 0 during the transmit mode of terminal 102, receiver 103 is disabled and does not receive the data on data pair 101. However, since common control 100 is not transmitting, its receiver 122 is enabled to receive the data on data pair 101.

With reference to FIG. 3, the operation of the circuitry of receiver 103 is described. As previously noted, receiver 122 is comprised of voltage comparators 301 and 302 connected in an inverse parallel manner via resistors 303-310, to data pair 101. Note, the operation of receiver 122 is identical to that of receiver 103 and will not be further described.

During the quiescent state the differential dc voltage (VT-VR) across data pair 101 is approximately zero volts and hence the outputs NRP and PRP of voltage comparators 301 and 302, respectively, are both zero. Since the voltage supply (+2.4 v) utilized to bias the negative terminal of voltage comparators 301 and 302 is more positive than the voltage supply (+2.3 v) utilized to bias the positive terminals of voltage comparators 301 and 302 an additional negative offset is created to increase the reverse bias and hence increase the effective quiescent voltage range. As shown in 400 of FIG. 4, the quiescent (Q) differential voltage range VT-VR for receivers 103 and 122 extends from −0.5 to +0.5 volts.

Assuming a logic 1 data signal appears across data pair 101, the voltage on the lead T is about +3.1 v and the voltage on lead R is about −1.7 v creating a differential voltage VT-VR of +1.4 volts. As shown by 400 of FIG. 4, a VT-VR greater than +1.1 v is received as a logic 1. With reference to FIG. 3, the VT-VR of +1.4 volts biases voltage comparator 302 "on" and further reverse biases voltage comparator 301. Thus, output PRP is logic 1 and NRP is logic 0.

Similarly, assuming a logic 0 on data pair 101 the differential voltage VT-VR is −1.4 v and, consequently, voltage comparator 302 is biased "off" and voltage comparator 301 is biased "on". Thus, for a received logic 0 output NRP is logic 1 and PRP is logic 0.

While in the preferred embodiment the end of a data transmission or control frame 402 is determined by counting data bits, it is obvious that, using the circuitry disclosed, receiver 103 could also determine the end of a data transmission by detecting the transition of voltage VT-VR from the binary state voltages to the quiescent state.

It should be obvious to one skilled in the art that the preferred embodiment shown in FIGS. 1, 2 and 3 can be implemented using well-known discrete logic circuits, large scale integration circuits, or microprocessor circuits. While the preferred embodiment is disclosed as part of a half-duplex data communication system its application in a full duplex data communication system is straightforward. Thus, what has been described is merely illustrative of the application of the principles of the present invention. Other methods and circuits can be implemented by those skilled in the art without departing from the spirit and scope of the present invention.

What is claimed is:

1. A circuit for signaling the start of an asynchronous binary data transmission over a communication pair of a data communication system; said signaling circuit comprising:

means for establishing during the absence of a binary data input signal, a quiescent differential voltage across said pair which is intermediate to a first and a second differential voltage representing, respectively, a logic 0 and a logic 1 of said binary data input signal; and means for switching said quiescent differential voltage across said pair to the differential voltage of a first bit of said binary data input signal to signal the start of said binary data transmission.

2. An asynchronous binary data communication system including a common control and a terminal for communicating over a communication pair, said system comprising:

means for establishing during the absence of a binary data input signal, a quiescent differential voltage across said pair which is intermediate to a first and a second differential voltage representing, respectively, a logic 0 and a logic 1 of said binary data input signal; and means for switching said quiescent differential voltage across said pair to the differential voltage of a first bit of said binary data signal to signal the start of said binary data transmission.

3. The communication system of claim 2 wherein said system comprises:

means responsive to a change in said differential voltage across said pair from said quiescent voltage level to the voltage level of said first bit of said binary data transmission for detecting the start of said binary transmission.

4. The communication system of claim 3 wherein said detecting means of said terminal comprises:

a first and second amplifier means each having inverting and non-inverting inputs, means for connecting one lead of said pair to both the inverting input of said first amplifier means and the non-inverting input of said second amplifier means and connecting the second lead of said pair to both the non-inverting input of said first amplifier means and the inverting input of said second amplifier means.

5. The communication system of claim 2 wherein said common control includes means for transmitting a binary data transmission having a predetermined number of bits and said terminal includes means for signaling the end of reception by counting said predetermined number of bits of said binary data transmission.

6. The communication system of claim 5 wherein said terminal further includes means responsive to said end of reception signaling means for indicating a valid reception of said binary data transmission and means responsive to said indicating means for transmitting a binary data transmission from said terminal.

7. The signaling circuit of claim 1 or the system of claim 2 wherein said switching means includes:

means for generating a first predetermined loop current flow in a first direction over said pair producing a differential voltage representing a logic 0 binary data input signal on said pair and means for generating a second predetermined loop current flow in a second direction over said pair producing a differential voltage representing a logic 1 binary data input signal on said pair.

8. The switching means of claim 7 wherein said first and second loop current generating means each comprises two substantially identical current sources including one current source for sourcing current to a first lead of said pair and the second current source for concurrently sinking current from a second lead of said pair.

9. The signaling circuit of claim 7 wherein said switching means further includes:

means for providing a first low impedance signal source across said pair when said differential voltage across said pair equals a first polarity predetermined voltage and means for providing a second low impedance signal source across said pair when said differential voltage across said pair equals a second polarity predetermined voltage.

10. The signaling circuit of claim 9 wherein said first and second low impedance signal source each includes a diode and voltage source for limiting the differential voltage applied to said pair, respectively, to said first and second polarity predetermined voltages.

11. The signaling circuit of claim 1 or 2 wherein said switching means includes:

means for generating during a differential voltage transition on said pair from said quiescent differential voltage to said first differential voltage a first predetermined loop current flow in a first direction over said pair, means for providing a low impedance across said pair when said differential voltage equals said first differential voltage, means for generating during a differential voltage transition on said pair from said quiescent differential voltage to said second differential voltage a second predetermined loop current flow in a second direction over said pair, and means for providing a low impedance across said pair when said differential voltage equals said second differential voltage.

12. A method of operating a circuit for signaling the start of an asynchronous binary data transmission over a communication pair comprising the steps of:

establishing during the absence of a binary data input signal, a quiescent differential voltage across said pair which is intermediate to a first and a second differential voltage representing, respectively, a logic 0 and a logic 1 of said binary data input signal; and switching said quiescent differential voltage across said pair to the differential voltage of a first bit of said binary data input signal to signal the start of said binary data transmission.

13. The method of claim 12 wherein said switching step includes the steps of:

generating a first predetermined current flow in a first direction over said pair producing a differential voltage representing a logic 0 binary data input signal on said pair and generating a second predetermined current flow in a second direction over said pair producing a differential voltage representing a logic 1 binary data input signal on said pair.

14. The method of claim 13 further including the steps of:

providing a first low impedance signal source across said pair when said differential voltage across said pair reaches a first polarity predetermined voltage and providing a second low impedance signal source across said pair when said differential voltage across said pair reaches a second polarity predetermined voltage.

* * * * *